United States Patent [19] [11] 3,928,362
Denzel et al. [45] Dec. 23, 1975

[54] DERIVATIVES OF PYRAZOLO[3,4-b]THIENO[2,3-d]PYRIDINE-2-CARBOXYLIC ACIDS

[75] Inventors: Theodor Denzel, Regensburg; Hans Hoehn, Tegernheim, both of Germany

[73] Assignee: E. R. Squibb & Sons, Inc., Princeton, N.J.

[22] Filed: Feb. 21, 1975

[21] Appl. No.: 551,810

Related U.S. Application Data

[62] Division of Ser. No. 401,798, Sept. 28, 1973, Pat. No. 3,887,570.

[52] U.S. Cl. .................. 260/294.8 B; 260/294.8 C; 260/295.5 B; 260/310 R; 424/263
[51] Int. Cl.² ............................... C07D 213/55
[58] Field of Search ............................ 260/294.8 B

[56] References Cited
UNITED STATES PATENTS
3,787,430  1/1974  Hoehn et al. .................. 260/294.8 B Primary Examiner—Alan L. Rotman
Attorney, Agent, or Firm—Lawrence S. Levinson; Merle J. Smith

[57] ABSTRACT

New derivatives of pyrazolo[3,4-b]thieno[2,3-d]-pyridine-2-carboxylic acids have the general formula

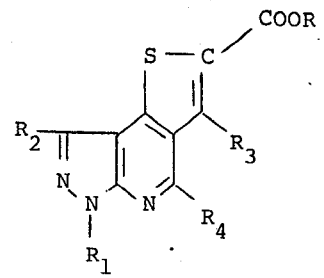

They are useful as antiinflammatory agents and central nervous system depressants. In addition, this type of compound increases the intracellular concentration of adenosine-3',5'-cyclic-monophosphate.

11 Claims, No Drawings

DERIVATIVES OF PYRAZOLO[3,4-b]THIENO[2,3-d]PYRIDINE-2-CARBOXYLIC ACIDS

This application is a division of application Ser. No. 401,798, filed Sept. 28, 1973, now U.S. Pat. No. 3,887,570, issued June 3, 1975.

SUMMARY OF THE INVENTION

This invention relates to new pyrazolo[3,4-b]-thieno[2,3-d]pyridine-2-carboxylic acids and esters. These new compounds have the general formula (I) 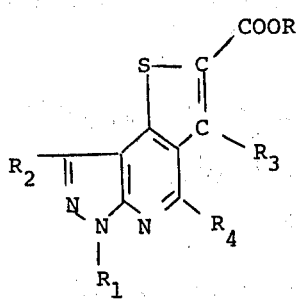

The symbols have the following meanings in formula I and throughout this specification.

R is hydrogen or lower alkyl.
$R_1$ is hydrogen, lower alkyl, phenyl or phenyl-lower alkyl.
$R_2$ is hydrogen or lower alkyl.
$R_3$ is lower alkyl, phenyl or substituted phenyl, hydroxy or lower alkoxy. $R_3$ can also be an acyclic basic nitrogen group

wherein $R_5$, $R_6$ each is hydrogen or lower alkyl. $R_3$ can also be a hydrazine,

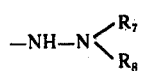

or a hydrazone

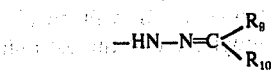

group, wherein $R_7$, $R_8$ and $R_9$ each represents a hydrogen, lower alkyl or phenyl. $R_{10}$ represents each of said groups other than hydrogen. $R_4$ is hydrogen, lower alkyl or phenyl.

The lower alkyl groups referred to throughout this specification include straight or branched chain hydrocarbon groups containing 1 to 7 carbon atoms, preferably 1 to 4 carbons. Examples of the type of groups contemplated are methyl, ethyl, propyl, isopropyl etc. The lower alkoxy groups include such lower alkyl groups bonded to an oxygen, e.g., methoxy, ethoxy, propoxy, isopropoxy, etc.

The substituted phenyl groups include one or two simple substituents, i.e., lower alkyl, halogen, (F, Cl, Br or I, preferably Cl or Br) trifluoromethyl, amino or carboxy.

Preferred embodiments of this invention are as follows:

R is hydrogen or lower alkyl, especially ethyl.
$R_1$ is hydrogen or lower alkyl, especially ethyl.
$R_2$ is hydrogen or lower alkyl, especially hydrogen.
$R_3$ is lower alkyl, phenyl, hydroxy, lower alkoxy, lower alkylamino, hydrazino or lower alkylhydrazino, lower alkylidenehydrazono, especially lower alkyl, phenyl, hydroxy, lower alkoxy particularly ethoxy, and also butylamino, hydrazino and isopropylidene-hydrazono.

DETAILED DESCRIPTION OF THE INVENTION

The new compounds of formula I are produced by the following series of reactions:
A 5-aminopyrazole of the formula (II) 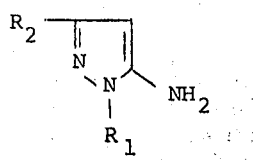

[prepared according to the procedure described in Z. f. Chemie 10, 386–388 (1970)] is made to react with an alkoxymethylene acid ester of the formula (III) 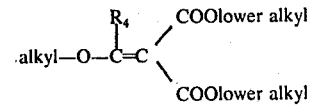

by heating at a temperature of about 120°C.
The resulting compound of the formula (IV) 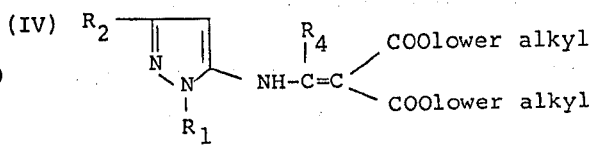

is cyclized in an inert organic solvent such as disphenyl ether at about 230° to 260°C., while distilling off the alcohol formed, producing a compound of the formula (V) 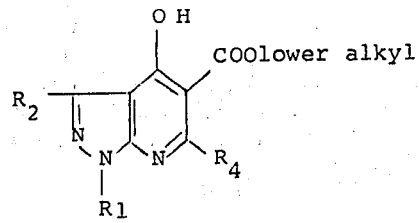

This compound of formula V is halogenated by treatment with an inorganic acid chloride like phosphorus oxychloride, thionyl chloride or the like, producing a compound of the formula (VI) 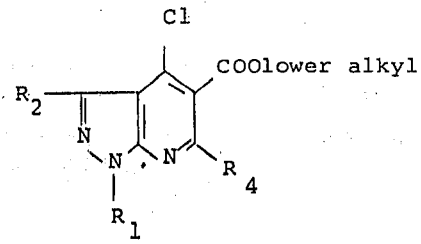

Alternatively, instead of cyclizing the ester compound of formula IV as described above, this product also undergoes cyclization by treatment with phosphorus oxychloride producing immediately the compound of formula VI.

By treatment of the compound of formula VI with a mercaptoacetic acid ester of the formula $$HS-CH_2-COOR \qquad (VII)$$

a compound of the formula (VIII)
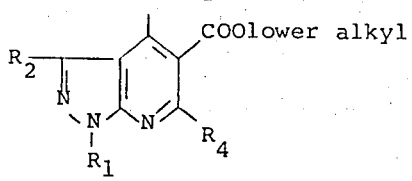

is produced.

On treatment with a base such as an alkali metal alcoholate like sodium ethoxide, or sodium hydride or potassium carbonate, the product of formula VIII undergoes cyclization forming a product of the formula (Ia)
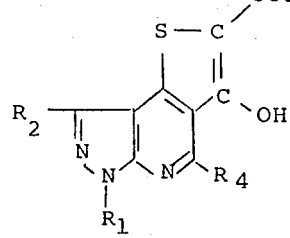

A compound of the formula (Ib)
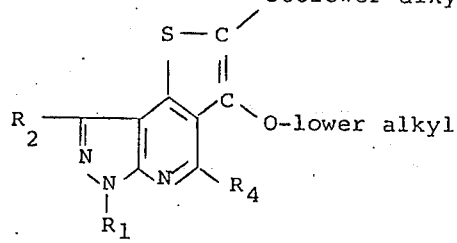

wherein $R_3$ is lower alkoxy as in formula Ib is now produced by reaction of the product of formula Ia with a lower alkyl halide in the presence of a base like potassium carbonate.

A compound of the formula (Ic)
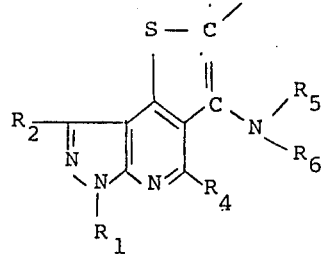

wherein $R_3$ is an amino group is formed on treatment of a compound of formula Ib with the appropriate amine

When using a hydrazine of formula (IX) $\qquad H_2N-N\begin{matrix}R_7\\R_8\end{matrix}$ instead of the amine in the same reaction, a compound of the formula (Id)
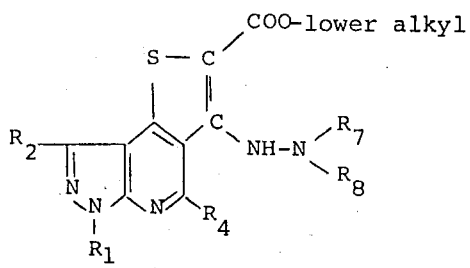

with a hydrazino group is formed.

A compound of the formula (Ie)
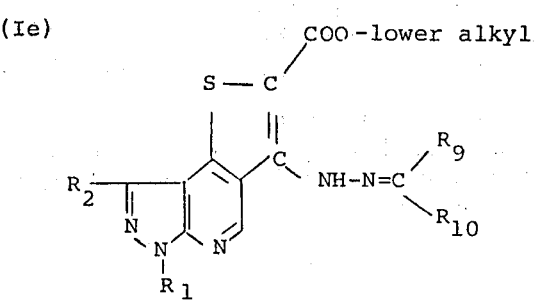

with a hydrazono group is now produced by reaction of a hydrazine ($R_7$, $R_8$=H) of formula Id with the appropriate aldehyde or ketone of the formula (X) $\qquad O=C\begin{matrix}R_9\\R_{10}\end{matrix}$ When $R_3$ in formula I is lower alkyl or a phenyl group, such compounds are produced by reaction of a 5-aminopyrazole of formula II with an alkoxymethylenebenzoyl or alkanoyl ester of the formula (XI)
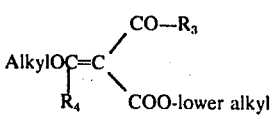

wherein $R_3$ is lower alkyl, phenyl or substituted phenyl.

The resulting product of the formula (IVa)

is processed as described above, i.e., cyclization, halogenation, reaction with the mercaptoacetic acid ester and repeated cyclization.

When $R_1$ is hydrogen in a compound of formula I, a modification of the above described procedure is used in which a 5-aminopyrazole of the formula (IIa)
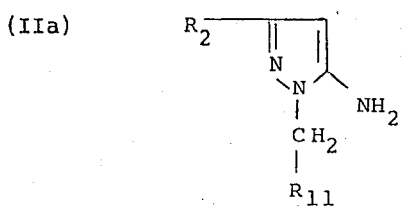

wherein $R_{11}$ is a hetero group like furfuryl, pyridyl, pyrimidyl or the like, is the starting material.

This material is processed as described above: through the reaction with the alkoxymethylene esters of formulas III and XI, cyclization of the product corresponding to formulas IV and IVa, to obtain a compound of formula VI which is made to react with the mercaptoacetic ester producing a compound of formula VIII which is cyclized to obtain a compound of the formula (If)
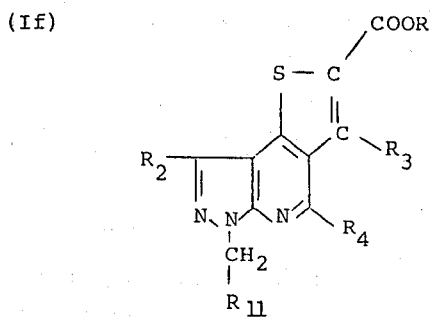

wherein $R_3$ is hydroxy, lower alkyl or phenyl. When $R_3$ is alkyl or phenyl, these compounds are oxidized with an oxidizing agent like selenium dioxide in a high boiling solvent like diethyleneglycol dimethyl ether to about 160° yielding the compound of formula I with hydrogen in the 1-position of the molecule.

When $R_3$ is hydroxy, the compound is alkylated, yielding a product of formula (Ig)
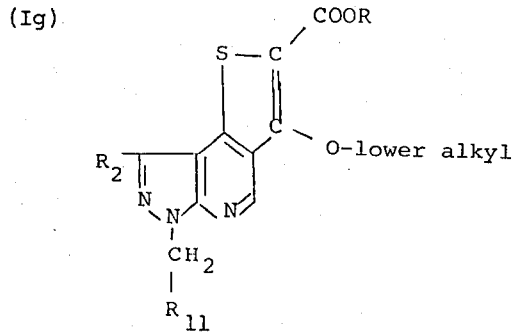

which is now oxidized as described above, producing a compound of formula Ib with hydrogen in the 1-position of the molecule. Compounds of formula Ic, d, e with hydrogen in the 1-position, bearing amino, hydrazino and hydrazono groups, are now produced in the same manner as described above.

The free acids, i.e., R is hydrogen, are obtained from the esters by hydrolysis, e.g., by treatment with alcoholic sodium hydroxide solution.

The new compounds of this invention have antiinflammatory properties and are useful as anti-inflammatory agents, for example, to reduce local inflammatory conditions such as those of an edematous nature or resulting from proliferation of connective tissue in various mammalian species such as rats, dogs and the like when given orally in dosages of about 5 to 50 mg/kg/day, preferably 5 to 25 mg/kg/day, in single or 2 to 4 divided doses, as indicated by the carageenan edema assay in rats. The active substance may be utilized in compositions such as tablets, capsules, solutions or suspensions containing up to about 300 mg. per unit of dosage of a compound or mixture of compounds of formula I. They may be compounded in conventional manner with a physiologically acceptable vehicle or carrier, excipient, binder, preservative, stabilizer, flavor, etc. as called for by accepted pharmaceutical practice. Topical preparations containing about 0.01 to 3 percent by weight of active substance in a lotion, salve or cream may also be used.

The new compounds of this invention also have central nervous system depressant activity and can be used as tranquilizers or ataractic agents for the relief of anxiety and tension states, for example, in mice, cats, rats, dogs and other mammalian species, in the same manner as chlordiazepoxide. For this purpose a compound or mixture of compounds of formula I is administered orally or parenterally in a conventional dosage form such as tablet, capsule, injectable or the like. A single dose, or preferably 2 to 4 divided daily doses, provided on a basis of about 1 to 50 mg. per kilogram per day, preferably about 2 to 15 mg. per kilogram per day, is appropriate. These may be conventionally formulated in an oral or parenteral dosage form by compounding about 10 to 250 mg. per unit of dosage with conventional vehicle, excipient, binder, preservative, stabilizer, flavor or the like as called for by accepted pharmaceutical practice.

The new compounds also increase the intracellular concentration of adenosine-3',5'-cyclic monophosphate, and thus by the administration of about 1 to 100 mg/kg/day, preferably about 10 to 50 mg/kg, in single or two to four divided doses in conventional oral or parenteral dosage forms such as those described above may be used to alleviate the symptoms of asthma.

The following examples are illustrative of the invention. All temperatures are expressed on the centigrade scale.

EXAMPLE 1

3-Ethoxy-6-ethyl-6H-pyrazolo[3,4-b]thieno[2,3-d]pyridine-2-carboxylic acid a. [[(1-ethyl-5-pyrazolyl)amino]methylene]malonic acid diethyl ether 245 G. of 1-Ethyl-5-aminopyrazole (2.2 mol.) and 476 g. of ethoxymethylene malonic acid diethyl ester (2.2 mol.) are heated to 120° (bath temperature) for 2 hours with stirring. The ethanol formed by this reaction is removed by means of a water aspirator. Then vacuum distillation (b.p. $_{0.1}$ 154°–160°) yields 520 g. (84%) of theory) of [[(1-ethyl-5-pyrazolyl)amino]methylene]malonic acid diethyl ester as a quickly crystallizing oil, m.p. 50°–53°.

The compound is recrystallized from N-hexane, m.p. 55°–57°. The hydrochloride salt is formed by treating the above product with dilute ethanolic hydrogen chloride solution.

b. 1-ethyl-4-hydroxy-1H-pyrazolo[3,4-b]pyridine-5-carboxylic acid ethyl ester

253 G. of [[(1-Ethyl-5-pyrazolyl)amino]methylene]-malonic acid diethyl ester (0.09 mol.) are dissolved in 770 g. of diphenyl ether. The reaction mixture is heated to 235°–250° (bath temperature) and allowed to react at this temperature for 1–2 hours while the resulting ethanol is continuously distilled off. The last amount of alcohol is removed by means of a water aspirator. The diphenyl ether is separated by distillation with a fractionating column in vacuo. The 1-ethyl-4-hydroxy-1H-pyrazolo[3,4-b]pyridine-5-carboxylic acid, ethyl ester, is obtained at b.p. $_{005}$ 115°–120°, yield 195 g. = 92% of theory, m.p. 85°–87°. The compound is recrystallized from benzene (90°–100°), m.p. 87°–89°.

c. 4-chloro-1-ethyl-1H-pyrazolo[3,4-b]pyridine-5-carboxylic acid, ethyl ester

A mixture of 23.5 g. of 1-ethyl-4-hydroxy-1H-pyrazolo [3,4-b]pyridine-5-carboxylic acid, ethyl ester, (0.1 mol.) and 150 ml. of phosphorus oxychloride is refluxed for 4 hours. Then the excess phosphorus oxychloride is removed by vacuum distillation. As soon as the phosphorus oxychloride has been removed, the oily residue solidifies on cooling. It is treated with water and filtered under suction (24.5 g.), m.p. 55°–60°. The 4-chloro-1-ethyl-1H-pyrazolo[3,4-b]pyridine-5-carboxylic acid, ethyl ester is recrystallized from n-hexane (22.5 g. = 87%), m.p. 62°.

d. 1-ethyl-4-(ethoxycarbonylmethyl)thio-1H-pyrazolo[3,4-b]pyridine-5-carboxylic acid, ethyl ester 50.5 G. of 4-Chloro-1-ethyl-1H-pyrazolo[3,4-b]pyridine-5-carboxylic acid ethyl ester, (0.2 mol.) are dissolved in 200 ml. of dimethylformamide. 25 g. of triethylamine are added and 24 g. of mercaptoacetic acid ethyl ester are dropped in with stirring. Stirring is continued at 40° for 5 hours. After this time, the mixture is cooled and water is added. 1-Ethyl-4-(ethoxycarbonylmethyl)thio-1H-pyrazolo[3,4-b]pyridine-5-carboxylic acid, ethyl ester, solidifies, is filtered off and recrystallized from ethyl acetate, yield 58 g. (86%), m.p. 62°–63°.

e. 6-ethyl-3-hydroxy-6H-pyrazolo[3,4-b]thieno[2,3-d]pyridine-2-carboxylic acid ethyl ester 3.4 G. of 1-Ethyl-4-(ethoxycarbonylmethyl)thio-1H-pyrazolo[3,4-b]pyridine-5-carboxylic acid, ethyl ester, (0.01 mol.) and 0.36 g. of sodium hydride (0.015 mol.) are refluxed for 3 hours in dry dioxane. The solution is acidified with acetic acid and evaporated to dryness. The product, 6-ethyl-3-hydroxy-6H-pyrazolo[3,4-b]thieno[2,3-d]pyridine-2-carboxylic acid ethyl ester is crystallized with water, filtered and recrystalllized from DMF, m.p. 155°–157°, yield 2.5 g. (79%).

f. 3-ethoxy-6-ethyl-6H-pyrazolo[3,4-b]thieno[2,3-d]pyridine-2-carboxylic acid, ethyl ester 1.45 G. of 6-Ethyl-3-hydroxy-6H-pyrazolo[3,4-b]thieno[2,3-d]pyridine-2-carboxylic acid, ethyl ester, (0.05 mol.), 1.4 g. of potassium carbonate (0.01 mol.) and 1.55 g. of ethyl iodide (0.01 mol.) are suspended in 10 ml. of dimethylformamide and stirred for 10 hours at 60°. After this period, the solid is filtered off and water is added to the filtrate, 3-ethoxy-6-ethyl-6H-pyrazolo[3,4-b]thieno[2,3-d]pyridine-2-carboxylic acid, ethyl ester, solidifies, is filtered off and recrystallized from ethyl acetate, m.p. 95°–96°, yield 1.1 g. (69%).

g. 3-ethoxy-6-ethyl-6H-pyrazolo[3,4-b]thieno[2,3-d]pyridine-2-carboxylic acid 3.2 G. of 3-Ethoxy-6-ethyl-6H-pyrazolo[3,4-b]thieno- [2,3-d]pyridine-2-carboxylic acid, ethyl ester (0.01 mol.) is treated for 10 hours at 50° with a solution of 1 g. of potassium hydroxide in 20 ml. of alcohol. The solvent is distilled off in vacuo, the residue is dissolved in 20 ml. of water and acidified with acetic acid. The 3-ethoxy-6-ethyl-6H-pyrazolo[3,4-b]thieno[2,3-d]pyridine-2-carboxylic acid solidifies, is filtered off and recrystallized from dimethylformamide, yield 2.1 g. (72%), m.p. 230°–231°.

EXAMPLE 2

3-(Butylamino)-6-ethyl-6H-pyrazolo[3,4-b]thieno[2,3-d]pyridine-2-carboxylic acid, ethyl ester 3.2 G. of 3-ethoxy-6-ethyl-6H-pyrazolo[3,4-b]thieno[2,3-d]pyridine-2-carboxylic acid, ethyl ester, and 10 ml. of butylamine are refluxed 24 hours with stirring. The excess butylamine is removed in vacuo and the residue, 3-(butylamino)-6-ethyl-6H-pyrazolo[3,4-b]thieno[2,3-d]pyridine-2-carboxylic acid, ethyl ester is recrystallized from methanol, yield 2.5 g. (72%), m.p. 106°–108°.

EXAMPLE 3

6-Ethyl-3-(isopropylidenehydrazino)-6H-pyrazolo[3,4-b]thieno[2,3-d]pyridine-2-carboxylic acid, ethyl ester a. 6-ethyl-3hydrazino-6H-pyrazolo[3,4-b]thieno[2,3-d]pyridine-2-carboxylic acid ethyl ester 3.2 G. of 3-ethoxy-6-ethyl-6H-pyrazolo[3,4-b]thieno[2,3-d]pyridine-2-carboxylic acid, ethyl ester (0.01 mol.) and 10 ml. of hydrazine hydrate are refluxed with 5 ml. of butylalcohol for 24 hours. The solvent and the excess hydrazine hydrate are removed in vacuo and the residue, 6-ethyl-3-hydrazino-6H-pyrazolo[3,4-b]thieno[2,3-d]pyridine-2-carboxylic acid ethyl ester is recrystallized from dimethylsulfoxide, yield 2.1 g. (68%), m.p. 227°–229°.

b. 6-ethyl-3-(isopropylidenehydrazino)-6H-pyrazolo[3,4-b]thieno[2,3-d]pyridine-2-carboxylic acid, ethyl ester 1.5 G. of 6-ethyl-3-hydrazino-6H-pyrazolo[3,4-b]thieno[2,3-d]pyridine-2-carboxylic acid, ethyl ester, (0.005 mol.) are refluxed in 10 ml. of acetone together with a few drops of acetic acid for 3 hours. The acetone is distilled off and the residue, 6-ethyl-3-(isopropylidenehydrazino)-6H-pyrazolo[3,4-b]thieno[2,3-d]pyridine-2-carboxylic acid, ethyl ester, is recrystallized from dimethylformamide, yield 0.9 g. (51%), m.p. 194°–196°.

EXAMPLE 4

6-Ethyl-3-phenyl-6H-pyrazolo[3,4-b]thieno[2,3-d]pyridine-2-carboxylic acid a. 5-benzoyl-1-ethyl-4-hydroxy-1H-pyrazolo[3,4-b]pyridine 222 G. of 5-amino-1-ethylpyrazole(2mol.) and 496 g. of ethyoxymethylenebenzoylacetic acid ethyl ester (2 mol.) are heated with stirring to about 140° until no more alcohol distills. The temperature is then raised to 240°. The alcohol formed is distilled off in vacuo. After about one hour the reaction is completed, the residue is cooled to room temperature and 500 ml. of methanol are added. 5-Benzoyl-1-ethyl-4-hydroxy-1H-pyrazolo[3,4-b]pyridine crystallizes and is filtered off, yield 360 g. (67%), m.p. 151°.

b. 5-benzoyl-4-chloro-1-ethyl-1H-pyrazolo[3,4-b]pyridine 53.5 G. of benzoyl-1-ethyl-4-hydroxy-1H-pyrazolo-[3,4-b]pyridine (0.2 mol.) and 150 ml. of phosphorus oxychloride are refluxed at 150° for 5 hours. The excess phosphorus halide is removed in vacuo and the residue neutralized with saturated sodium bicarbonate solution. The pale yellow crystals of 5-benzoyl-4-chloro-1-ethyl-1H-pyrazolo[3,4-b]pyridine are filtered off and recrystallized from ethyl acetate, yield 35 g. (61%), m.p. 140°.

c. 5-benzoyl-1-ethyl-4-(ethoxycarbonylmethyl)thio-1H-pyrazolo[3,4-b]pyridine 28.5 G. of 5-benzoyl-4-chloro-1-ethyl-1H-pyrazolo[3,4-b]pyridine (0.1 mol.), 12.5 g. of triethylamine and 12 g. of mercaptoacetic acid ethyl ester are heated with stirring in 150 ml. of dimethylformamide at 60° for 5 hours. The undissolved material is filtered off and the filtrate treated with water. 5-Benzoyl-1-ethyl-4-(ethoxycarbonylmethyl)thio-1H-pyrazolo[3,4-b]pyridine separates and is recrystallized from butanol, yield 28.2 g. (76%), m.p. 157°–160°.

d. 6-ethyl-3-phenyl-6H-pyrazolo[3,4-b]thieno[2,3-d]pyridine-2-carboxylic acid, ethyl ester 3.7 G. of 5-benzoyl-1-ethyl-4-(ethoxycarbonylmethyl)-thio-1-H-pyrazolo[3,4-b]pyridine (0.01 mol.) and 0.24 g. of sodium hydride are refluxed for 5 hours in dry dioxane. After this time, the solvent is distilled off and the residue, 6-ethyl-3-phenyl-6H-pyrazolo[3,4-b]thieno[2,3-d]pyridine-2-carboxylic acid, ethyl ester, is recrystallized from butanol, yield 2.2 g. (63%), m.p. 162°–164°.

e. 6-ethyl-3-phenyl-6H-pyrazolo[3,4-b]thieno[2,3-d]pyridine-2-carboxylic acid 3.5 G. of 6-ethyl-3-phenyl-6H-pyrazolo[3,4-b]thieno[2,3-d]pyridine-2-carboxylic acid, ethyl ester, (0.01 mol.) are treated with a solution of 1 g. of potassium hydroxide in 20 ml. of ethyl alcohol at 60° for 10 hours. The mixture is evaporated to dryness, the residue is dissolved in 20 ml. of water and acidified with acetic acid. The ethyl-3-phenyl-6H-pyrazolo[3,4-b]thieno[2,3-d]pyridine-2-carboxylic acid precipitates, is filtered off and recrystallized from dimethylformamide, yield 2.1 g. (65%), m.p. 276°–278°.

EXAMPLE 5

3-Ethoxy-6H-pyrazolo[3,4-b]thieno[2,3-d]pyridine carboxylic acid and ethyl ester 4-Hydroxy-1-(2-furyl)methyl-1H-pyrazolo[3,4-b]-pyridine-5-carboxylic acid ethyl ester (produced as described in Example 56 of application Ser. No. 169,536, filed Aug. 5, 1971, U.S. Pat. No. 3,755,340, issued Aug. 28, 1973) is treated as described in parts b through f of Example 1 to obtain 3-ethoxy-6-(2-furyl)-methyl-6H-pyrazolo[3,4-b]thieno[2,3-d]pyridine-2-carboxylic acid, ethyl ester. 0.1 mol. of this product and 20 g. of selenium dioxide (0.18 mol.) are suspended in 100 ml. of diethyleneglycol dimethyl ether. The mixture is heated with stirring at 160° and a few drops of water are added. The temperature is maintained for about one hour. After cooling, 100 ml. of water are added and the mixture is neutralized with dilute ammonia to obtain 3-ethoxy-6H-pyrazolo[3,4-b]thieno[2,3-d]pyridine-2-carboxylic acid, ethyl ester. This product is hydrolyzed as in Example 1 g to obtain 3-ethoxy-6H-pyrazolo[3,4-b]thieno[2,3d]pyridine-2-carboxylic acid.

EXAMPLE 6

3-Phenyl-6H-pyrazolo[3,4-b]thieno[2,3-d]pyridine-2-carboxylic acid and ethyl ester 5-Benzoyl-4-hydroxy-1-(2-furyl)methyl-1H-pyrazolo[3,4-b]pyridine (produced as described in Example 5 of application Ser. No. 361,120, filed May 17, 1973) is treated as described in parts b through d of Example 4 to obtain 6-(2-furyl)methyl-3-phenyl-6H-pyrazolo[3,4-b]thieno[2,3-d]-pyridine-2-carboxylic acid, ethyl ester. This product is then treated with selenium dioxide and subsequently hydrolyzed as in Example 5 to obtain 3-phenyl-6H-pyrazolo[3,4-b]thieno[2,3-d]pyridine-2-carboxylic acid, ethyl ester, and the free acid, respectively.

EXAMPLE 7

The following additional compounds are produced by the procedure of Example 1:

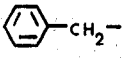

| R | R₁ | R₂ | R₃ | R₄ |
|---|----|----|----|----|
| C₂H₅ | C₂H₅ | CH₃ | OH | 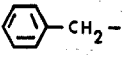 |
| iC₃H₇ | C₂H₅ | C₂H₅ | OC₃H₇(i) | H |
| CH₃ | 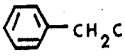 | CH₃ | OH | H |
| CH₃ | 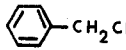 | CH₃ | OC₂H₅ | H |
| H | CH₃ | CH₃ | OC₂H₅ | H |
| C₂H₅ |  | CH₃ | OH | CH₃ |
| CH₃ |  | H | OC₂H₅ | CH₃ |
| CH₃ | CH₃ | C₃H₇ | OH | CH₃ |
| CH₃ | CH₃ | C₃H₇ | OC₂H₅ | CH₃ |
| C₂H₅ | C₂H₅ | CH₃ | CH₃– | H |
| C₂H₅ | C₂H₅ | H | NH₂– | H |
| C₄H₉ | CH₃ | H | CF₃– | H |
| CH₃ | C₂H₅ | H | Cl– | H |

EXAMPLE 8

By treating each of the products of Example 7 wherein $R_3$ is a lower alkoxy group by the procedure of Example 2 with butylamine, dimethylamine, diethylamine and ammonia, respectively, the following additional products are obtained:

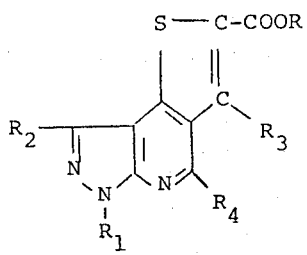

EXAMPLE 9

By treating each of the products of Example 5 or Example 7 wherein $R_3$ is a lower alkoxy group with the hydrazine in the first column by the procedure of Example 3, the following products are obtained:

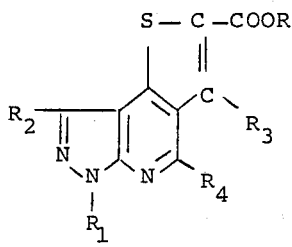

| $H_2N-N{<}{R_7 \atop R_8}$ | R | $R_1$ | $R_2$ | $R_3$ | $R_4$ |
|---|---|---|---|---|---|
| $H_2N-NH_2$ | $C_2H_5$ | H | H | $-HN-NH_2$ | H |
| $H_2N-NHC_2H_5$ | $C_2H_5$ | H | H | $-HN-NHC_2H_5$ | H |
| $H_2N-N(CH_3)_2$ | $C_2H_5$ | H | H | $-HN-N(CH_3)_2$ | H |
| $H_2N-NHC_6H_5$ | $C_2H_5$ | H | H | $-HN-NHC_6H_5$ | H |
| $H_2N-N(CH_3)_2$ | $iC_3H_7$ | $C_2H_5$ | $C_2H_5$ | $-HN-N(CH_3)_2$ | H |
| $H_2N-NH(C_6H_5)$ | $CH_3$ | ⟨C_6H_4⟩-CH_2- | $CH_3$ | $-HN-NH(C_6H_5)$ | H |
| $H_2N-NH_2$ | $CH_3$ | ⟨C_6H_4⟩-CH_2CH_2- | H | $-HN-NH_2$ | $CH_3$ |
| $H_2N-NHC_2H_5$ | $CH_3$ | $CH_3$ | $C_3H_7$ | $-HN-NHC_2H_5$ | $CH_3$ |

| R | $R_1$ | $R_2$ | $R_3$ | $R_4$ |
|---|---|---|---|---|
| $iC_3H_7$ | $C_2H_5$ | $C_2H_5$ | $NH-C_4H_9$ $N(CH_3)_2$ $N(C_2H_5)_2$ $NH_2$ | H |
| $CH_3$ | ⟨C_6H_4⟩-CH_2- | $CH_3$ | $NH-C_4H_9$ $N(CH_3)_2$ $N(C_2H_5)_2$ $NH_2$ | H |
| H | $CH_3$ | $CH_3$ | $NH-C_4H_9$ $N(CH_3)_2$ $N(C_2H_5)_2$ $NH_2$ | H |
| $CH_3$ | ⟨C_6H_4⟩-CH_2CH_2- | H | $NH-C_4H_9$ $N(CH_3)_2$ $N(C_2H_5)_2$ $NH_2$ | $CH_3$ |
| $CH_3$ | $CH_3$ | $C_3H_7$ | $NH-C_4H_9$ $N(CH_3)_2$ $N(C_2H_5)_2$ $NH_2$ | $CH_3$ |

EXAMPLE 10

By following the procedure of Example 3b and utilizing the hydrazines of Examples 3a and 9 with the aldehyde or ketone in the first column, the following products are obtained:

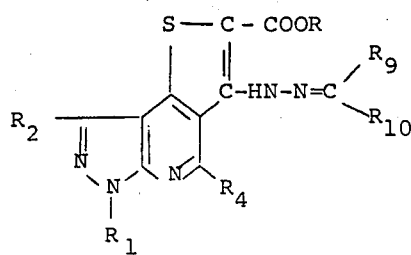

| ${R_9 \atop R_{10}}{>}C=O$ | R | $R_1$ | $R_2$ | $R_4$ | $R_9$ | $R_{10}$ |
|---|---|---|---|---|---|---|
| $C_6H_5CHO$ | $C_2H_5$ | $C_2H_5$ | H | H | H | $C_6H_5$ |
| $(CH_3)_2CO$ | $C_2H_5$ | H | H | H | $CH_3$ | $CH_3$ |
| $CH_3CHO$ | $C_2H_5$ | H | H | H | H | $CH_3$ |
| $C_6H_5CHO$ | $C_2H_5$ | H | H | H | H | $C_6H_5$ |
| $(CH_3)_2CO$ | $CH_3$ | ⟨C_6H_4⟩-CH_2CH_2- | H | $CH_3$ | $CH_3$ | $CH_3$ |
| $C_2H_5CHO$ | $CH_3$ | ⟨C_6H_4⟩-CH_2CH_2- | H | $CH_3$ | H | $C_2H_5$ |
| $(C_2H_5)_2CO$ | $C_2H_5$ | $C_2H_5$ | H | H | $C_2H_5$ | $C_2H_5$ |
| $(C_2H_5)_2CO$ | $C_2H_5$ | $C_2H_5$ | H | H | $C_6H_5$ | $C_6H_5$ |

What is claimed is:
1. A compound of the formula

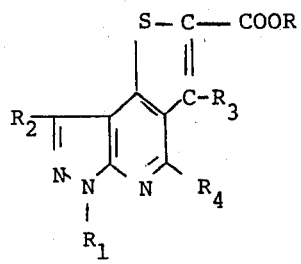

wherein
R and $R_2$ each is hydrogen or lower alkyl;
$R_1$ is hydrogen, lower alkyl, phenyl, benzyl or phenethyl;
$R_3$ is

or

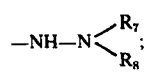

$R_4$ is hydrogen, lower alkyl or phenyl;
$R_5$ and $R_6$ each is hydrogen or lower alkyl; and
$R_7$ and $R_8$ each is hydrogen, lower alkyl or phenyl.

2. A compound as in claim 1 wherein R, $R_1$ and $R_2$ each is hydrogen or lower alkyl, and $R_3$ is lower alkylamino, hydrazino or lower alkylhydrazino.

3. A compound as in claim 1 wherein R and $R_1$ each is lower alkyl, $R_2$ and $R_4$ each is hydrogen.

4. A compound as in claim 3 wherein $R_3$ is lower alkylamino.

5. A compound as in claim 3 wherein $R_3$ is (di-lower alkyl)amino.

6. A compound as in claim 3 wherein $R_3$ is hydrazino.

7. A compound as in claim 3 wherein each alkyl group is ethyl and $R_3$ is butylamino.

8. A compound as in claim 3 wherein each alkyl group is ethyl and $R_3$ is dimethylamino.

9. A compound as in claim 3 wherein each alkyl group is ethyl and $R_3$ is hydrazino.

10. A compound as in claim 1 wherein R is lower alkyl, $R_1$, $R_2$ and $R_4$ each is hydrogen, and $R_3$ is lower alkylhydrazino.

11. A compound as in claim 10 wherein each lower alkyl group is ethyl.

* * * * *